United States Patent
Clements

(10) Patent No.: US 8,308,366 B2
(45) Date of Patent: Nov. 13, 2012

(54) SELF-ALIGNING JOURNAL BEARING

(75) Inventor: Martin A. Clements, North Royalton, OH (US)

(73) Assignee: Eaton Industrial Corporation, Cleveland, OH (US)

( * ) Notice: Subject to any disclaimer, the term of this patent is extended or adjusted under 35 U.S.C. 154(b) by 690 days.

(21) Appl. No.: 12/487,354

(22) Filed: Jun. 18, 2009

(65) Prior Publication Data

US 2010/0322542 A1   Dec. 23, 2010

(51) Int. Cl.
F16C 23/04 (2006.01)
F16C 35/00 (2006.01)

(52) U.S. Cl. ........................................ 384/192; 384/435

(58) Field of Classification Search ................ 384/117, 384/120, 122, 191.1–191.2, 192, 306, 308, 384/309, 312, 428, 435; 418/30, 156, 173, 418/152, 307; 417/213, 220
See application file for complete search history.

(56) References Cited

U.S. PATENT DOCUMENTS

| | | | |
|---|---|---|---|
| 2,509,256 A * | 5/1950 | Sorensen ...................... | 417/213 |
| 2,892,663 A | 6/1959 | Nickerson | |
| 3,417,704 A | 12/1968 | Pall et al. | |
| 3,574,492 A | 4/1971 | Schwary | |
| 3,711,169 A * | 1/1973 | Gardner ........................ | 384/309 |
| 3,994,541 A * | 11/1976 | Geary et al. .................. | 384/117 |
| 4,322,116 A * | 3/1982 | Heinemann et al. .......... | 384/306 |
| 4,336,006 A | 6/1982 | Grabow et al. | |
| 4,568,204 A * | 2/1986 | Chambers ..................... | 384/309 |
| 4,594,009 A * | 6/1986 | Gutris ........................... | 384/203 |
| 4,605,363 A | 8/1986 | Walsh | |
| 4,714,357 A * | 12/1987 | Groth et al. .................... | 384/312 |
| 5,271,676 A * | 12/1993 | Keck et al. ...................... | 384/111 |
| 5,407,334 A | 4/1995 | Sano et al. | |
| 5,518,380 A * | 5/1996 | Fujii et al. ....................... | 418/26 |
| 5,738,445 A | 4/1998 | Gardner | |
| 5,795,076 A * | 8/1998 | Ball et al. ....................... | 384/307 |
| 5,873,351 A * | 2/1999 | Vars et al. ....................... | 123/527 |
| 5,921,731 A * | 7/1999 | Chandrasekar ................ | 409/231 |
| 6,016,832 A * | 1/2000 | Vars et al. .................... | 137/487.5 |
| 6,022,201 A * | 2/2000 | Kasmer ............................ | 418/1 |

(Continued)

FOREIGN PATENT DOCUMENTS

JP   61236916 A  * 10/1986

(Continued)

OTHER PUBLICATIONS

PCT/IB2010/001467 International Search Report and Written Opinion, mailed Nov. 5, 2010.

Primary Examiner — Marcus Charles
(74) Attorney, Agent, or Firm — Fay Sharpe LLP

(57) ABSTRACT

A rotary machine includes a housing, and a rotating component received therein for rotation relative to the housing. A shaft imparts rotational movement to the rotating component around a first axis from an associated motive input. A bearing assembly is interposed between the rotating shaft and the housing and the bearing assembly includes a bearing member that is self-aligning. The self-aligning bearing assembly includes a bearing member having a recess extending substantially parallel to the first axis, and a journal sleeve received in the recess and interposed between the shaft and the bearing member. The journal sleeve is fixed to the shaft for rotation therewith and includes a flexible joint connection with the shaft to permit self-alignment of the shaft and bearing.

20 Claims, 5 Drawing Sheets

U.S. PATENT DOCUMENTS

| | | | |
|---|---|---|---|
| 6,120,256 A * | 9/2000 | Miyazawa | 417/220 |
| 6,155,797 A * | 12/2000 | Kazuyoshi | 417/220 |
| 6,217,296 B1 * | 4/2001 | Miyazawa et al. | 417/310 |
| 6,375,441 B1 * | 4/2002 | Ichizuki et al. | 418/30 |
| 6,402,487 B1 * | 6/2002 | Clements et al. | 418/26 |
| 6,467,966 B1 | 10/2002 | Diederich et al. | |
| 6,767,133 B2 * | 7/2004 | New | 384/309 |
| 7,108,493 B2 * | 9/2006 | Clements et al. | 418/30 |
| 7,172,352 B2 * | 2/2007 | Close et al. | 384/192 |
| 7,207,785 B2 | 4/2007 | Dalton et al. | |
| 7,247,008 B2 * | 7/2007 | Clements et al. | 384/308 |
| 7,491,043 B2 * | 2/2009 | Clements et al. | 418/173 |
| 2001/0036412 A1 * | 11/2001 | Konishi | 417/220 |
| 2003/0012468 A1 * | 1/2003 | New | 384/312 |
| 2006/0269423 A1 | 11/2006 | Clements et al. | |

FOREIGN PATENT DOCUMENTS

| | | | |
|---|---|---|---|
| JP | 03149412 A | * | 6/1991 |
| JP | 06147225 A | * | 5/1994 |
| JP | 09 219951 A | | 8/1997 |

* cited by examiner

SELF-ALIGNING JOURNAL BEARING

BACKGROUND OF THE DISCLOSURE

This application relates to a bearing arrangement, and particularly a self-aligning journal bearing for a rotary pump.

The load carrying capacity of conventional style journal bearings is limited by small deflections of a loaded shaft. Unfortunately, deflections, even small deflections, are unavoidable in such a mechanical device. In most instances, the shaft is held in as rigid a manner as possible in the housing. For example, a bearing assembly supports the shaft at one or more locations along the length of the shaft to provide adequate support of the shaft. Controlling or limiting the amount of deflection is important because too much shaft deflection results in operational issues with the rotary machine.

In this particular rotary machine application, i.e., a rotary pump, the drive shaft is rotated by a motor and transfers the rotary motion to the pump. The pump rotor imparts energy to the fluid in a well-known manner and thereby increases fluid pressure between the pump inlet and outlet. Misalignment of the rotor relative to stationary portions of the rotary machine can lead to severe deviations of the rotor or shaft and consequently non-uniform load bearing. Conventional journal bearings are sized to a specified or rated load-carrying capacity of the pump which necessarily entails designing the pump assembly as if uniform load bearing were to be achieved since the precise amount of misalignment can be estimated. Designers, of course, recognize that some imperfection or misalignment will exist and therefore purposefully accommodate or incorporate expected misalignment into the ratings for the pump.

However, improvements are needed in order to accommodate misalignment between the rotating and stationary components of the rotary machine, namely, the journal bearing and shaft, and thereby provide a better support structure that addresses the misalignment issue and its impact on the bearing assembly, and necessarily the design and performance of the rotary machine. There is also a need to minimize the weight and size of the pump, all in a manner that is economical, effective, and does not adversely impact the bearing assembly and operation of the rotary machine.

SUMMARY OF THE DISCLOSURE

A rotary machine includes a housing, and a rotating component received therein for rotation relative to the housing. A shaft imparts rotational movement to the rotating component around a first axis from an associated motive input. A bearing assembly is interposed between the rotating shaft and the housing and the bearing assembly includes a bearing member that is self-aligning.

The self-aligning bearing assembly includes a bearing member having a recess extending substantially parallel to the first axis, and a journal sleeve received in the recess and interposed between the shaft and the bearing member. The journal sleeve is fixed to the shaft for rotation therewith and includes a flexible joint connection with the shaft to permit self-alignment of the shaft and bearing.

The bearing assembly preferably includes first and second bearing portions disposed at axially spaced locations along the shaft.

Preferably, an inner diameter surface of the journal sleeve is rounded or crowned, having a portion of a first inner diameter dimension less than a remainder of the inner diameter surface, although alternatively an outer diameter surface of the shaft could be rounded.

A pin interposed between the shaft and the journal sleeve ensures rotation of the sleeve with the shaft. A groove in an outer diameter of the shaft receives at least a portion of the pin, and likewise a groove in the journal sleeve also receives at least a portion of the pin.

The groove in the shaft terminates in a location spaced axially inward of terminal ends of the shaft.

The first bearing assembly has a first thread direction, and the second bearing assembly portion has an opposite hand, second thread direction.

A primary benefit of the arrangement is a pump that can accept shaft misalignment or deflection.

Still another advantage of the invention relates to the ability to limit the size of the shaft, i.e., to a dimension sufficient or just sufficient to be driven by a spline. Consequently, surrounding components of the rotary machine (e.g., in a pump, the rotor, cam ring, and yoke assemblies, can also be reduced in size).

By incorporating the self-aligning journal bearing into the arrangement, substantial weight savings is achieved.

Still other advantages and benefits of the disclosure will become apparent from reading and understanding the following detailed description.

DETAILED DESCRIPTION OF THE PREFERRED EMBODIMENTS

Figure 1:
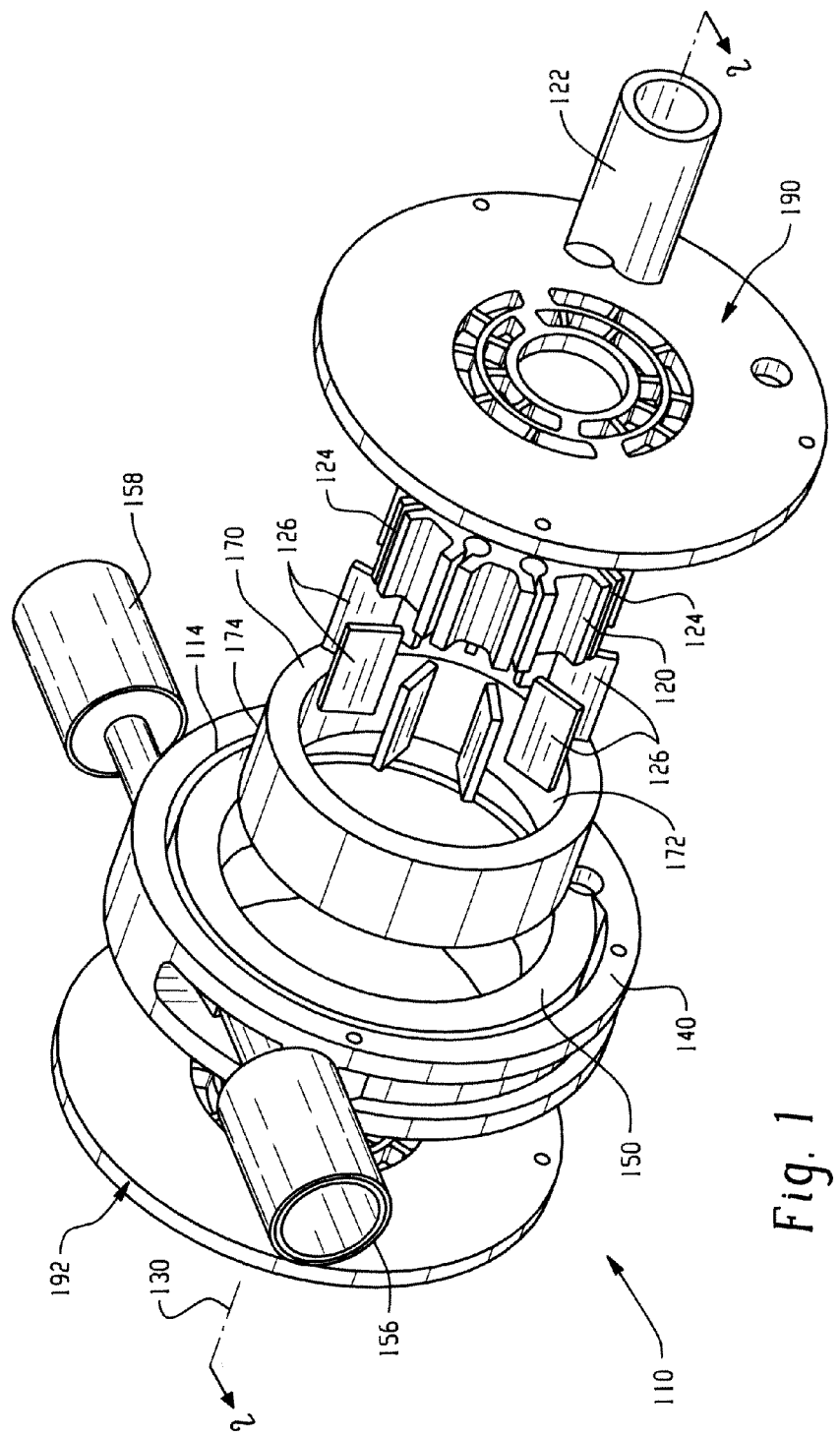
FIG. 1 is perspective view of a variable displacement rotary (VDR) pump.
Figure 2:
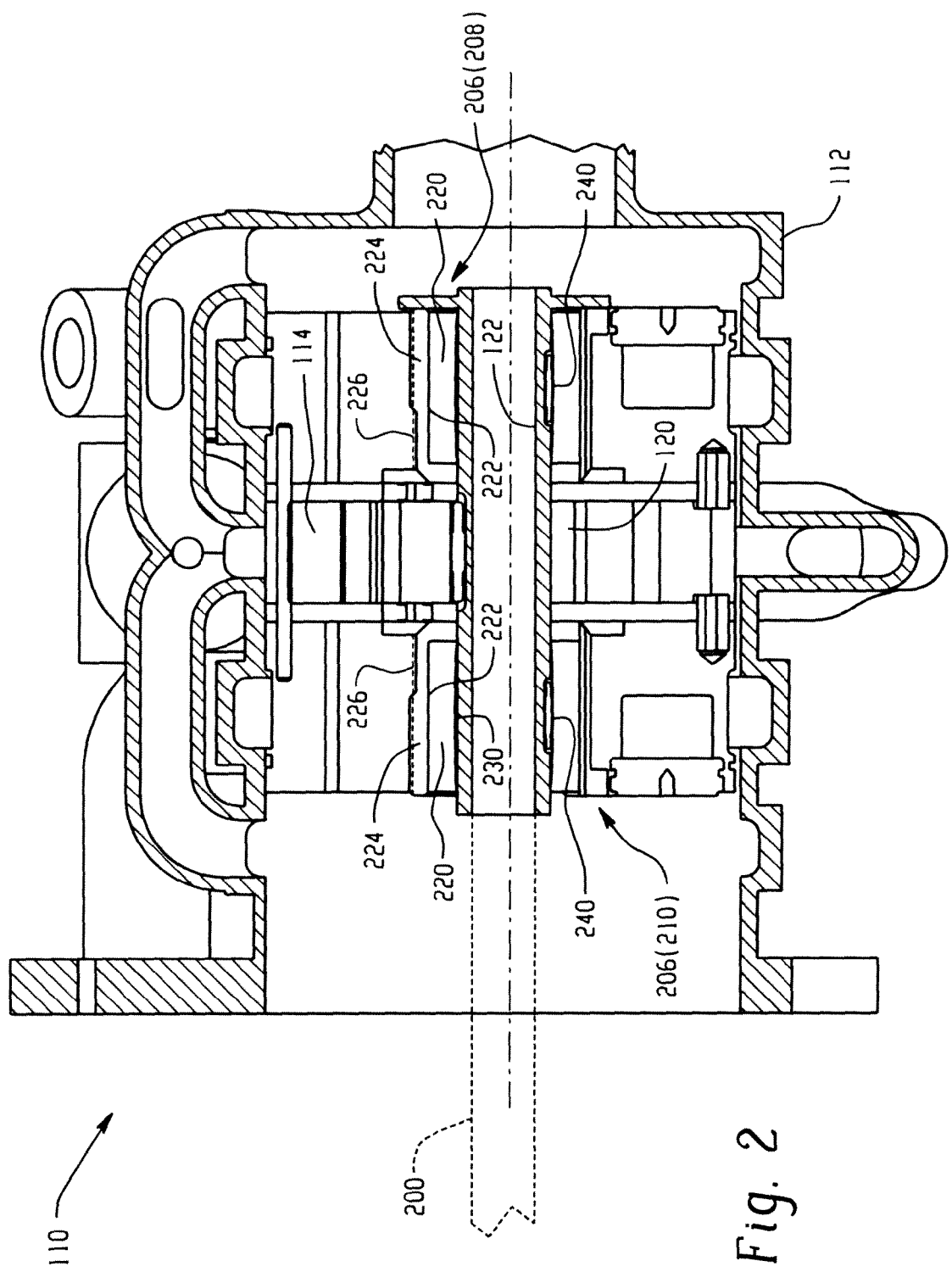
FIG. 2 is a cross-sectional view taken generally along the lines 2-2 of FIG. 1.

Turning initially to FIGS. 1 and 2, there is shown a rotary machine, and particularly a variable displacement pump 110 having a rotating cam ring of the type shown and described in commonly owned U.S. Pat. No. 7,108,493, the details of which are expressly incorporated herein by reference. The pump assembly 110 includes a housing 112 having a pump chamber 114. Rotatably received in the chamber is a rotor 120 secured to a shaft 122 for rotating the rotor within the chamber. Circumferentially spaced about the rotor are a series of radially extending grooves 124. Each groove is dimensioned to operatively receive a blade or vane 126 having outer radial tips that extend from the periphery of the rotor. The vanes may vary in number from one pump design to another. The shaft 122 rotates about a longitudinal or rotary axis 130. Depending on the actuation, some of the vanes may extend outwardly from the periphery of the rotor to a greater extent than the remaining vanes about the periphery of the rotor. Pumping chambers are defined between each of the vanes as the vanes rotate in the pump chamber with the rotor and provide positive displacement of the fluid in a manner well known in the art.

A spacer ring 140 is received around the rotor. The spacer ring has a substantially flat or planar surface 142 that receives a pin 144. The pin positions a cam sleeve 150 around the rotor. First and second lobes or actuating surfaces extend from the cam sleeve and cooperate with first and second actuator assemblies 156, 158 to selectively alter a position of the cam sleeve. In this manner, and as is well known in the art, the stroke or displacement of the pump may be altered.

Received within the cam sleeve is a rotating cam member or ring 170. Preferably, the cam ring has a smooth, inner peripheral wall 172 that is adapted for contact by outer tips of the individual vanes 126 extending from the rotor. An outer, smooth peripheral wall 174 of the cam ring is configured for free rotation within the cam sleeve 150. A hydrodynamic bearing supports the rotating cam ring 170 within the sleeve, and the journal bearing is filled with pump fluid, here jet fuel, to form a hydrostatic or hydrodynamic, or a hybrid hydrostatic/hydrodynamic bearing. Frictional forces developed between outer tips of the vanes and the rotating cam ring result in a cam ring 170 that rotates at approximately the same speed as the rotor. The cam ring, however, is free to rotate relative to the rotor, since there is no mechanical structural component interlocking the cam ring for rotation with the rotor. Typically, the cam ring rotates slightly less than the speed of the rotor, or even slightly greater than the speed of the rotor, and due to the support/operation of the fluid-filled bearing, the cam ring possesses a much lower magnitude of viscous drag. First and second pressure plates 190, 192 are supported in the housing. The pressure plates include openings for providing inlet and outlet fluid to the pump chamber. Generally, the pressure plates serve the same structure and function as described in the commonly-assigned patent.

Figure 3:
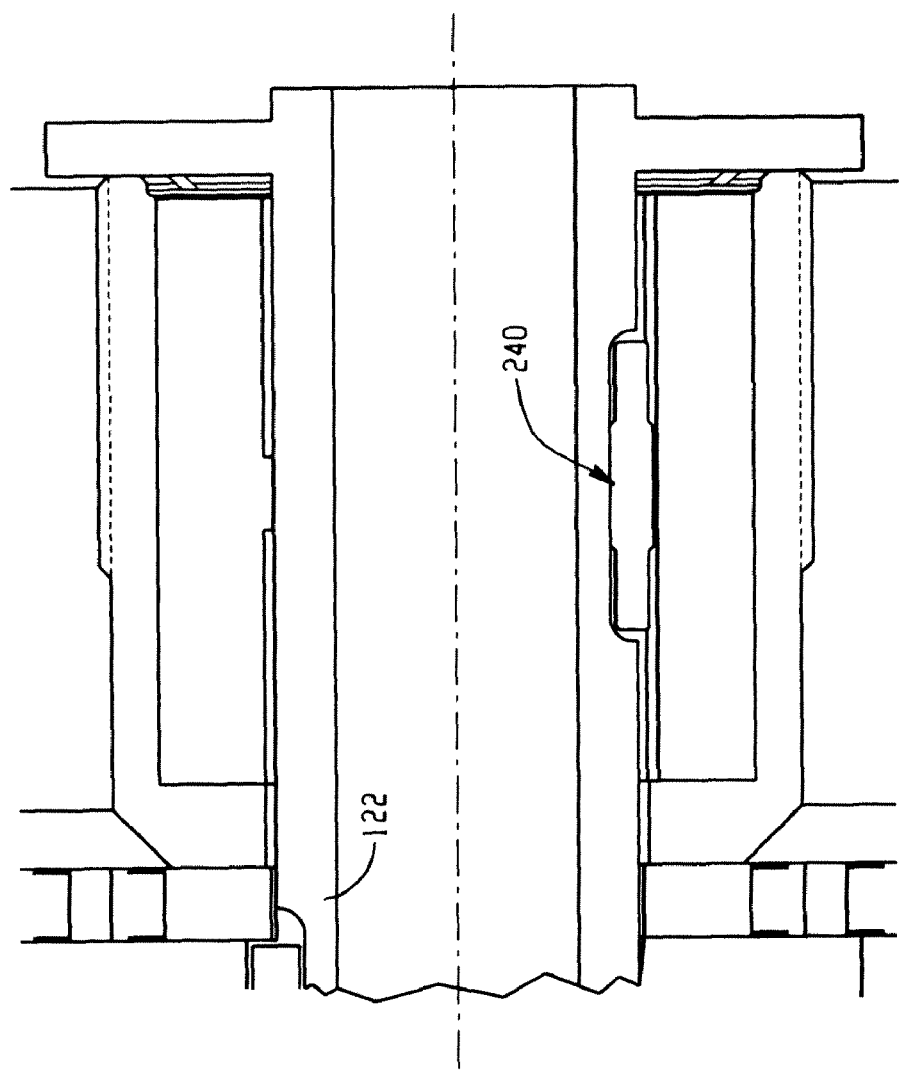
FIG. 3 is an enlarged cross-sectional view of the interface between the journal sleeve, bearing member and shaft.
Figure 4:
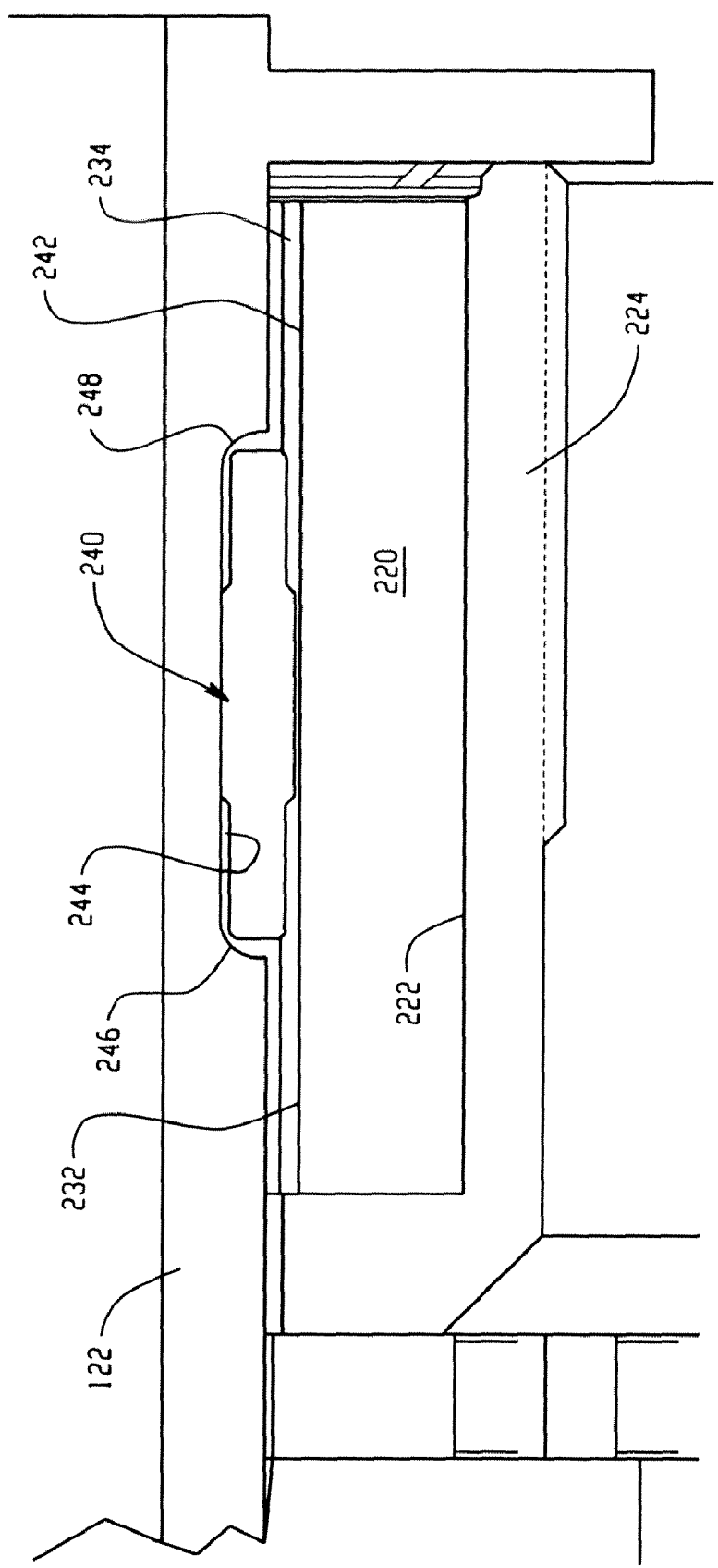
FIG. 4 is an enlarged cross-sectional view similar to FIG. 3 and further illustrating positioning of a connection member between the journal sleeve and shaft.

As shown in FIG. 2, spline drive 200 extends through the housing and is driven by an associated motor drive (not shown). Hollow shaft 122 rotates with the spline drive. Whereas the shaft sleeve is typically supported at one end in a bearing assembly, the arrangement of FIG. 2 illustrates a split bearing assembly 206 arrangement. That is, bearing assembly 206 includes a first or right-hand bearing portion 208 and a second or left-hand bearing portion 210. Each bearing portion 208, 210 is substantially identical unless particularly noted otherwise, and the bearing portion 210 is enlarged in FIGS. 3 and 4 for ease of illustration. The bearing portion includes a journal insert 220 received in a recess 222 of leaded bronze bearing 224. The bearing 224 is externally threaded at one end 226 to a respective pressure plate. Preferably, the right-hand and left-hand bearing portions have opposite threads or opposite lay, such as a right-hand and left-hand thread for securing to a respective pressure plate. The inner diameter of the recess 222 in each bearing 224 has a close mating fit with the outer cylindrical surface of the journal insert. In addition, the journal insert is preferably crowned along its inner diameter as noted by reference numeral 230 (FIGS. 2 and 3). In this manner, first and second opposite ends 232, 234 of each journal insert have a slightly greater inner diameter than the central crown portion 230. This serves as the sole contact region between the journal insert and the outer diameter of the hollow sleeve of the shaft. This purposeful contact point along the central portion of the journal insert allows for relative misalignment between the hollow shaft and the journal insert.

In addition, a connection/drive member or pin 240 (FIGS. 2 and 4) is partially received in the journal insert and partially received in the hollow shaft so that the components rotate together. Particularly, a groove 242 extends through the entire axial length of the inner diameter of the journal insert. A groove or recess 244 provided in the outer diameter of the hollow shaft extends over a limited axial length only, i.e., opposite ends 246, 248 of the groove 244 are radiused or merge into the outer diameter of the shaft. This prevents the connecting member 240 from migrating axially along the shaft 122.

Figure 5:
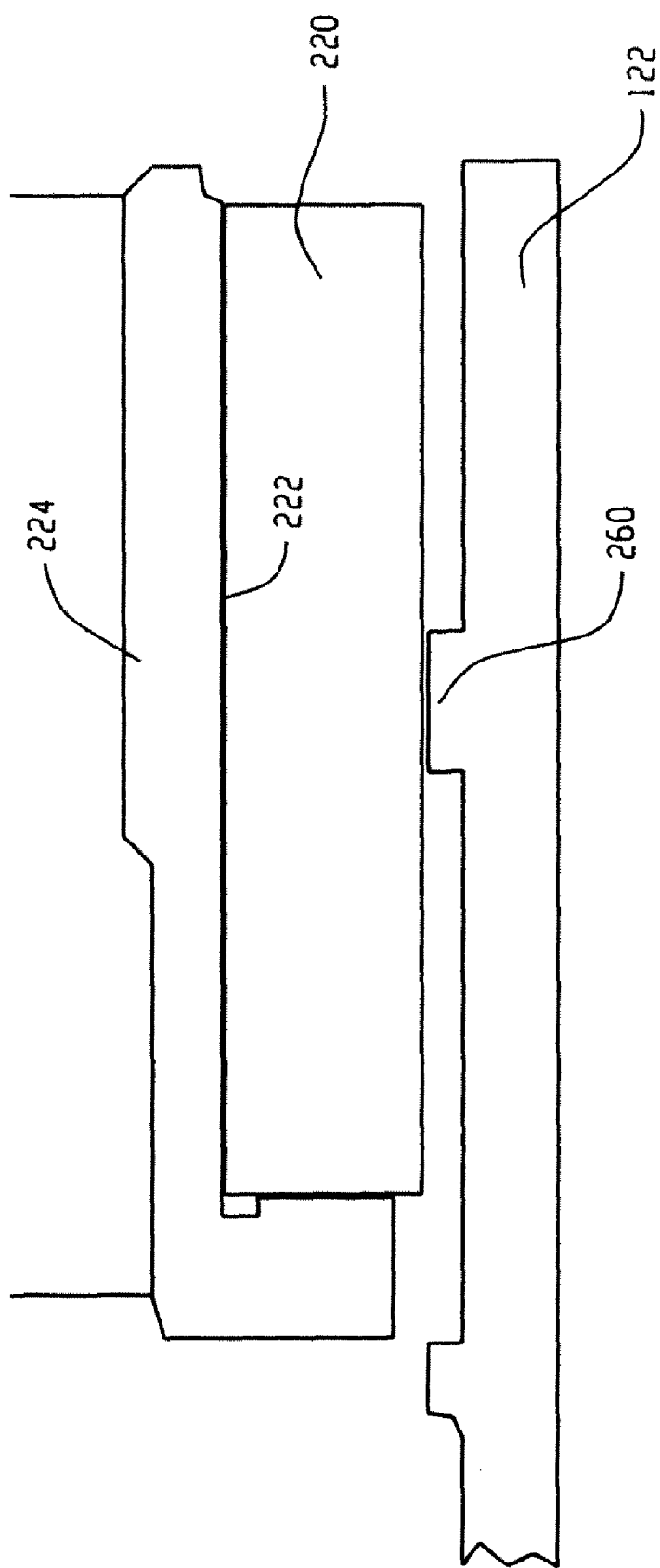
FIG. 5 is an enlarged cross-section view of an alternative arrangement.

Although the insert is crowned along its inner diameter portion relative to the shaft, it will be appreciated that, although not as desirable, the outer diameter portion of the shaft can alternatively be crowned. The misalignment or limited deflection may be addressed by the crowned surface 260 on an outer surface of the shaft 122 (FIG. 5), i.e., move the crowned surface radially inward from the inner diameter surface of the journal insert to the outer surface of the shaft. This would still accommodate limited misalignment/deflection.

It is preferred that the crowned surface be along the inner diameter of the journal insert in order to minimize the dimensions of the assembly. Thus, the bearing assembly of the present disclosure is preferably a split bearing arrangement that purposefully provides a flexible joint between the journal insert and the shaft that allows or accommodates deflection of misalignment of the shaft relative to stationary components of the rotary machine or pump.

The ability to accept or accommodate shaft deflection or misalignment also has the advantageous benefit of allowing a reduction in the size of the remaining components of the pump and, just as importantly, can result in a substantial weight savings over prior arrangements. Thus, the size of the shaft can be limited, i.e., dimensioned to be of sufficient size to be driven by the spline, and the rotor, cam ring, yoke, etc. all can be appropriately reduced in size since these components are assembled radially outward of the shaft and bearing. A reduction in the diameter or radial dimension of these components results in a potential substantial weight savings since the volume of these components is dependent on the square of the radial dimension.

By way of example only, one embodiment of the prior arrangement of the rigid shaft results in a pump weight of approximately ninety-five (95) pounds. By using the self-aligning bearing rated for the same pump parameters that provides for a flexible joint between the shaft and bearing assembly, a total weight of seventy (70) pounds is achieved. Again, the volume varies as a result of the square of the radius, so that any reduction in the radial direction will result in a substantial reduction in material used and thus a substantial reduction in the weight.

Cupping the opposite ends 246, 248 of the slot 242 in the outer diameter of the hollow shaft prevents the connection member or pin from "walking-up" or travelling along the length of the shaft. Thus reducing the diameter of the pin at each end also allows the radius of the cutout to be absorbed. In this manner, the pin does not act like a wedge within the slot.

Preferred materials of construction also could impact performance of the rotary machine. For example, in the exemplary embodiments, the shaft and journal insert are preferably formed from steel or another similar material that has desired strength and precludes wear. The connection member is preferably a tungsten carbide material does not wear as quickly as the steel shaft and journal, and in fact contributes to reduced wear of the shaft and journal groove portions while also providing a longer lasting joint. Thus, although a steel connection member could be used, the steel connection member would not have the extended joint life benefits offered by the tungsten carbide version. The journal bearing as described previously is preferably a leaded bronze material, although other suitable bearing materials could be used.

The invention has been described with reference to the preferred embodiments. Modifications and alterations will occur to others upon reading and understanding this specifi-

Having thus described the invention, I claim:

1. A rotary machine comprising:
   a housing;
   a rotary member received in the housing for rotation relative thereto;
   a shaft for imparting rotational movement about a first axis from an associated motive input to the rotary member; and
   a bearing assembly interposed between the shaft and the housing including a bearing member having a recess extending substantially parallel to the first axis, and a journal sleeve interposed between the shaft and the bearing member in the recess, and the journal sleeve connected to the shaft for rotation therewith and including a joint connection with the shaft to permit self-alignment of the shaft and bearing.

2. The rotary machine of claim 1 wherein the bearing assembly includes first and second portions disposed at axially spaced locations.

3. The rotary machine of claim 1 wherein the inner diameter surface of the journal sleeve is crowned.

4. The rotary machine of claim 3 wherein the inner diameter surface of the journal surface has a central portion with a first inner diameter dimension less than a remainder of the inner diameter surface.

5. The rotary machine of claim 1 further comprising a drive member interposed between the shaft and the journal sleeve for ensuring rotation of the journal sleeve with the shaft.

6. The rotary machine of claim 5 wherein the drive member is a pin.

7. The rotary pump assembly of claim 5 further comprising a groove in an outer diameter of the shaft for receiving at least a portion of the drive member.

8. The rotary pump of claim 7 further comprising a groove in an inner diameter of the journal sleeve for receiving at least a portion of the drive member.

9. The rotary pump of claim 8 wherein the groove in the shaft terminates at a location spaced axially inward of terminal ends of the shaft.

10. The rotary pump of claim 8 wherein the bearing is fixedly received in a stationary housing.

11. The rotary pump of claim 1 wherein the flexible joint connection includes a crowned surface on an external surface region of the shaft.

12. A pump comprising:
    a housing;
    a shaft extending into the housing for rotation about a first axis relative thereto;
    a rotary pump member received on the shaft; and
    a bearing assembly received in the housing for supporting the shaft therein, the bearing assembly including a bearing having an axially extending recess, and a journal sleeve received in the bearing recess and radially positioned between the shaft and the bearing, a member for securing the journal sleeve for rotation with the shaft, and dissimilar facing surfaces on one of the journal sleeve and shaft and the journal sleeve and bearing, to accommodate misalignment of the shaft.

13. The pump of claim 12 wherein the fixing member is a pin partially received in the shaft and the journal sleeve.

14. The pump of claim 12 wherein the shaft and the journal sleeve each include a groove in facing surfaces that receive the fixing member therein.

15. The pump of claim 12 wherein one of the facing surfaces includes a crowned surface and the other surface is substantially cylindrical.

16. The pump of claim 15 wherein the shaft has the substantially cylindrical surface, and the journal sleeve has the crowned surface.

17. The pump of claim 16 wherein the crowned surface of the journal sleeve is a radial inner surface that includes an axially central, first diameter less than first and second opposite ends.

18. The pump of claim 17 wherein a radial outer surface of the journal sleeve is substantially cylindrical and mates with a radial inner, substantially cylindrical surface of the bearing.

19. The pump of claim 12 wherein the bearing assembly includes first and second axially spaced portions.

20. A rotary machine comprising:
    a housing;
    a shaft received in the housing adapted for rotational movement about a first axis relative to the housing; and
    a bearing assembly rotatably supporting the shaft in the housing, the bearing assembly including a bearing member having a recess extending substantially parallel to the first axis that receives a journal sleeve therein, and the journal sleeve connected to the shaft for rotation therewith and including a joint connection with the shaft to permit self-alignment of the shaft and bearing.

* * * * *